(12) United States Patent
Jackson et al.

(10) Patent No.: US 9,870,298 B2
(45) Date of Patent: Jan. 16, 2018

(54) APPLICATION RESOURCE UTILIZATION MANAGEMENT

(71) Applicant: Google Inc., Mountain View, CA (US)

(72) Inventors: Dean Kenneth Jackson, Pittsburgh, PA (US); Daniel Victor Klein, Pittsburgh, PA (US)

(73) Assignee: Google LLC, Mountain View, CA (US)

( * ) Notice: Subject to any disclaimer, the term of this patent is extended or adjusted under 35 U.S.C. 154(b) by 154 days.

(21) Appl. No.: 13/975,719

(22) Filed: Aug. 26, 2013

(65) Prior Publication Data

US 2015/0058679 A1 Feb. 26, 2015

(51) Int. Cl.
*G06F 9/46* (2006.01)
*G06F 11/34* (2006.01)
*G06F 9/52* (2006.01)
*G06F 11/07* (2006.01)
*G06Q 30/06* (2012.01)
*H04W 4/00* (2009.01)
*G06F 9/445* (2006.01)

(52) U.S. Cl.
CPC ...... *G06F 11/3433* (2013.01); *G06F 9/44552* (2013.01); *G06F 9/52* (2013.01); *G06F 11/0742* (2013.01); *G06F 11/0793* (2013.01); *G06Q 30/0601* (2013.01); *H04W 4/003* (2013.01); *G06F 8/62* (2013.01); *G06F 8/65* (2013.01); *G06F 11/3409* (2013.01); *H04W 4/001* (2013.01)

(58) Field of Classification Search
None
See application file for complete search history.

(56) References Cited

U.S. PATENT DOCUMENTS

| | | | | |
|---|---|---|---|---|
| 4,750,116 A | * | 6/1988 | Pham | G06F 3/16 718/104 |
| 5,692,209 A | * | 11/1997 | Meaney et al. | 710/244 |
| 5,794,011 A | * | 8/1998 | Paul | G06F 11/3419 703/22 |
| 6,240,414 B1 | * | 5/2001 | Beizer et al. | |
| 6,377,540 B1 | * | 4/2002 | Hogberg et al. | 370/216 |
| 6,694,288 B2 | * | 2/2004 | Smocha | G06F 11/3409 702/176 |

(Continued)

OTHER PUBLICATIONS

International Search Report and Written Opinion issued Sep. 16, 2014 in corresponding International Application No. PCT/US2014/044062.

*Primary Examiner* — Van Nguyen
(74) *Attorney, Agent, or Firm* — Morris & Kamlay LLP (57) ABSTRACT

Methods and systems for automatically identifying an application that is experiencing performance problems caused by a resource utilization event may include receiving an indication that an application is experiencing a performance issue. It may be determined that the performance issue is caused by a resource utilization event on a device. The resource utilization event may include the application and one or more other applications running simultaneously, use of one or more functions of the device simultaneously by at least one of the first application and one or more other applications, and/or a resource utilization overload based on simultaneous use of a plurality of sensors on the device. Next, action may be taken to correct the performance issue of the application.

26 Claims, 3 Drawing Sheets

(56) References Cited

U.S. PATENT DOCUMENTS

| | | | |
|---|---|---|---|
| 6,823,382 B2* | 11/2004 | Stone | G06F 11/0715 709/202 |
| 6,944,642 B1* | 9/2005 | Hopmann et al. | 709/203 |
| 6,944,798 B2* | 9/2005 | Stephenson | G06F 11/004 709/224 |
| 7,028,225 B2* | 4/2006 | Maso | G06F 11/3438 702/186 |
| 7,150,020 B2* | 12/2006 | Kalhour | 718/104 |
| 7,165,041 B1* | 1/2007 | Guheen | G06Q 30/04 705/26.1 |
| 7,167,965 B2* | 1/2007 | Alvarez | G06F 11/3433 707/E17.005 |
| 7,185,237 B2* | 2/2007 | Stephenson | G06F 11/004 709/223 |
| 7,526,685 B2* | 4/2009 | Noy | G06F 11/3438 702/186 |
| 7,526,766 B2* | 4/2009 | Asai et al. | 718/103 |
| 7,617,498 B1* | 11/2009 | Lumsden | G06F 9/52 707/999.1 |
| 7,831,975 B2 | 11/2010 | Ode | |
| 8,065,399 B2* | 11/2011 | McFate | G06F 9/5027 709/221 |
| 8,443,083 B2 | 5/2013 | Khushu et al. | |
| 8,527,814 B1* | 9/2013 | Elwell | G06F 11/0709 714/2 |
| 8,938,719 B2* | 1/2015 | Anjan | G06F 11/3672 717/126 |
| 8,972,967 B2* | 3/2015 | Sannidhanam | G06F 8/60 717/170 |
| 9,110,752 B2* | 8/2015 | Sherman | G06F 8/61 |
| 2003/0014381 A1 | 1/2003 | McMillan et al. | |
| 2008/0271025 A1* | 10/2008 | Gross | G06F 11/3051 718/102 |
| 2009/0055340 A1 | 2/2009 | Lakshminarayanan et al. | |
| 2009/0144756 A1 | 6/2009 | Inami | |
| 2012/0227053 A1 | 9/2012 | Gargash et al. | |
| 2013/0111025 A1 | 5/2013 | Sampathkumaran et al. | |
| 2014/0019958 A1* | 1/2014 | Sherman | G06F 8/61 717/178 |
| 2014/0289719 A1* | 9/2014 | Dewan | G06F 8/71 717/170 |

* cited by examiner

APPLICATION RESOURCE UTILIZATION MANAGEMENT

BACKGROUND

Mobile application stores allow for automatic and/or on-demand downloads and updates of an application. However, as the mobile application marketplace expands, issues have arisen relating to reliability and operability of some applications. For example, some applications may experience performance issues caused by resource utilization events such as when running simultaneously with other applications and/or when using multiple sensors on a device. Application performance issues caused by such resource utilization events may result in user dissatisfaction and impaired application operability.

BRIEF SUMMARY

According to an embodiment of the disclosed subject matter, a method includes receiving an indication that a first application is experiencing a performance issue. It may be determined that the performance issue is caused by a resource utilization event on a device. A resource utilization event may be the first application and one or more other applications running simultaneously, the first application and one or more other applications using one or more functions of the device simultaneously, and/or a resource utilization overload based on simultaneous use of a plurality of sensors on the device. Next, action may be taken to correct the performance issue of the first application.

An implementation of the disclosed subject matter provides a system that includes a processor configured to receive an indication that a first application is experiencing a performance issue. It may be determined that the performance issue is caused by a resource utilization event on a device. A resource utilization event may be the first application and one or more other applications running simultaneously, the first application and one or more other applications using one or more functions of the device simultaneously, and/or a resource utilization overload based on simultaneous use of a plurality of sensors on the device. Next, the processor may be configured to take action to correct the performance issue of the first application.

Implementations of the disclosed subject matter may provide improved monitoring of application operability issues caused by resource utilization events and easier management of application performance. The disclosed subject matter provides methods for automatically taking action to correct a performance issue that an application has been experiencing, which may result in improved application operability and increased user satisfaction. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

The market for mobile applications is rapidly growing, but the ability to identify and correct performance issues of an application has lagged behind. As the number and variety of applications available in the market increase, so has the likelihood that an application may experience performance issues when run in conjunction with other applications and/or when utilizing multiple functions/sensors of a mobile device. In particular, determining the cause of an application performance issue may make it possible to help fix the cause of the performance issue and/or take action to alleviate user dissatisfaction.

An application provider may monitor the performance of applications by gathering performance criteria data such as a list of other applications that are installed on a user's device when a performance issue arises with a poorly performing application, a list of other applications that are running on a user's device at the time a performance issue arises with a poorly performing application, how often an application is run on a device, how long the application is the primary item displayed on the device screen, the degree of interaction (e.g., the frequency and number of different inputs to device sensors such as touch, tilt, shake, and the like) when an application is running on a device, and the like.

Specifically, some applications may experience performance issues caused by resource utilization events such as when running simultaneously with other applications, when using multiple functions of a device, and/or when using multiple sensors on a device. An application may experience performance issues when running simultaneously or in conjunction with other applications. For example, a weather application may experience performance issues when running in combination with specific stock ticker and city guide applications. Further, application data permissions may be different for applications running simultaneously, for example, a photo editing application and a social networking application may be running simultaneously and each may be attempting to use the mobile device's camera function at the same time, resulting in either one or both applications failing and/or crashing. Additionally, an application may experience performance issues because of an overload associated with resources being used while running the application. For example, a gaming application may use multiple sensors on a device, such as a touch screen, an accelerometer, and a tilt sensor. The gaming application may crash and/or have performance issues based on an overload caused by simultaneous use of these multiple sensors.

For example, a device operating system may receive performance criteria for an application such as crash reports, activity not responding reports, battery reports, running services reports, user initiated feedback reports, network reports, and the like. The device operating system may provide these performance criteria to an application provider. A system may evaluate and monitor this performance information to determine if there have been any changes in the performance of the application. If there has been an increase in the number or severity of performance issues relating to a specific version of the application, the application provider may evaluate the performance criteria and determine that the performance issue is caused by a resource utilization event. As a result, an action may be taken to correct the performance issue and/or alleviate user dissatisfaction with the poorly performing application.

The present disclosure proposes a method for automatically identifying a particular application and/or a particular version of an application that is experiencing performance problems caused by a resource utilization event. A resource utilization event may include two or more applications running simultaneously, two or more applications using one or more device functions at the same time, and/or an overload based on simultaneous use of multiple device sensors.

A device may be a mobile device, a smartphone, a laptop, a tablet, a PC, a wearable computer, an appliance, and any other device capable of running an application. Various devices may perform and/or include multiple functions. For example, functions of a device may include camera, battery, touchscreen, keyboard, display, memory, Bluetooth, media player, location service, cellular network service, Internet service, messaging service, voice command service, streaming content service, and the like. A variety of sensors may also be included on a device such as touchscreen, accelerometer, tilt, rotation, gyroscope, orientation, digital compass, barometer, microphone, camera, ambient light, proximity, ambient temperature, gravity, motion, GPS, radiation, and the like.

Figure 1:
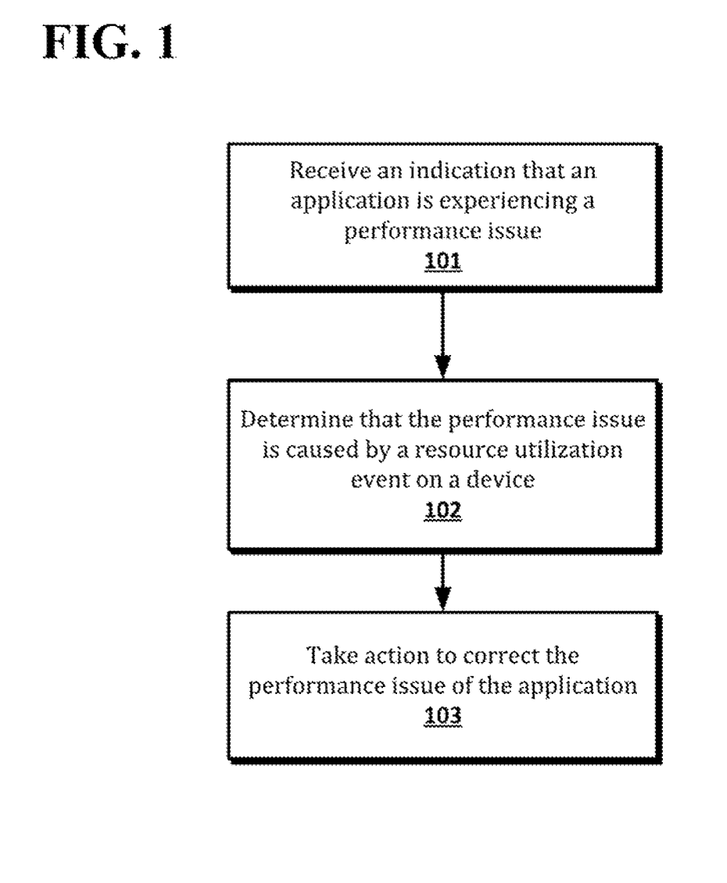
FIG. 1 shows an example process according to an implementation of the disclosed subject matter.

FIG. 1 shows an example process according to an implementation of the disclosed subject matter. As shown in FIG. 1, a method may include receiving an indication that a first application is experiencing a performance issue, at 101. It may be determined that the performance issue is caused by a resource utilization event on a device, at 102. A resource utilization event may be one or more of the following: an application and one or more other applications running simultaneously, use of one or more functions of the device simultaneously by at least one of the first application and one or more other applications, and/or a resource utilization overload based on simultaneous use of a plurality of sensors on the device. Next, action may be taken to correct the performance issue of the first application, at 103.

A performance issue may be any issue relating to the performance of an application caused by a resource utilization event. Examples of a performance issue may include a run time error, an application failure, an application crash, an activity not responding error, a user-initiated negative feedback, a poor battery usage report, a processing delay, a processing error, a trapped error, and the like.

As an example, performance criteria may be received from devices running version 6 of a social network application. The performance criteria may include crash reports, data indicating other applications running at the same time as version 6 of the social network application during the crash reports, and user-initiated feedback reports from the devices. Based on the criteria, it may be determined that version 6 of the social network application is crashing due to a resource utilization event, in particular while running simultaneously with version 2 of a weather application. Accordingly, an application may take action to correct this performance issue, for example, by notifying the application developers of version 6 of the social network application and version 2 of the weather application of the performance issue.

According to an implementation, a system may include a processor configured to receive an indication that a first application is experiencing a performance issue. It may be determined that the performance issue is caused by a resource utilization event on a device. As discussed above, a resource utilization event may be the first application and one or more other applications running simultaneously, use of one or more functions of the device simultaneously by the first application, or the first application and one or more other applications, and/or a resource utilization overload based on simultaneous use of a plurality of sensors on the device. Next, action may be taken to correct the performance issue of the first application.

Figure 2:
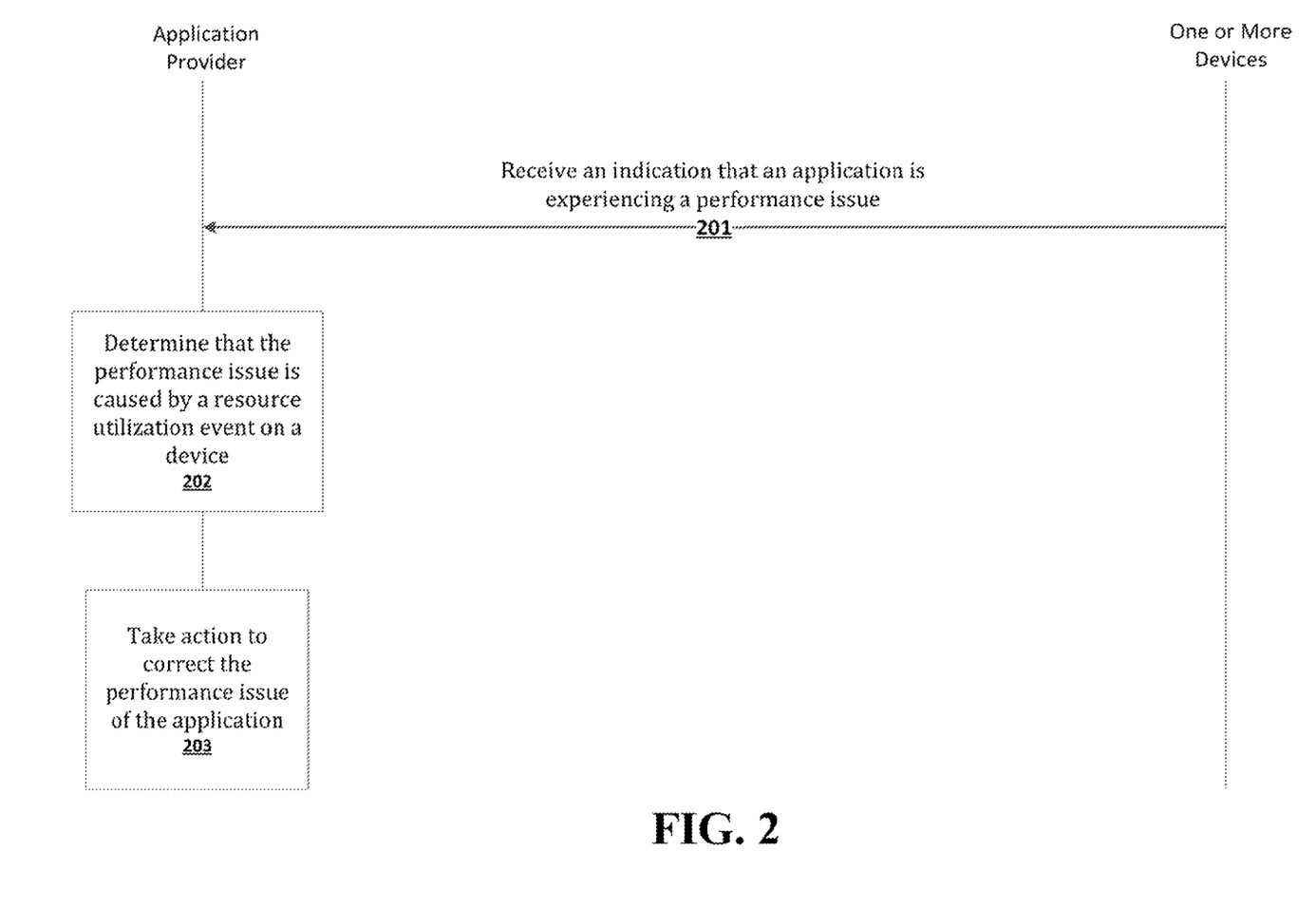
FIG. 2 shows an example information flow according to an implementation of the disclosed subject matter.

FIG. 2 shows an example information flow according to an implementation of the disclosed subject matter. An application provider may receive an indication that an application is experiencing a performance issue from one or more devices, at 201. The application provider may determine that the performance issue is caused by a resource utilization event, at 202. Next, the application provider may take action to correct the performance issue of the application.

In general, several actions may be taken to correct the performance issue of an application. These various actions may be taken automatically by a system that provides, stores, or executes the applications, as described in further detail below. A device may take corrective action automatically, such as by upgrading, downgrading, or suspending execution of one or both of the applications. For example, a device may reallocate resources, prioritize the use of resources by applications, implement a delay for use of a function by an application, implement a delay for use of a sensor by an application, and the like. Further, an application provider may stop providing the application to users, notify the application developer of the cause of the performance problem, refund the cost of the application to a user, issue an application store credit to a user, and the like. For example, where the applications are installed on a mobile computing device such as a smartphone, the device may automatically provide a notification to a user or a developer that there is a conflict between the applications, by identifying the performance issue and one or both of the applications, or the like. Additionally, an application provider may pause sales of the application to users, notify users that the application may be available soon, warn a user that the application may not work on his hardware, and/or notify a user of the version of the OS on which the application will work.

In an implementation, upon identifying that an application is experiencing a performance issue caused by a resource utilization event, an action to correct the performance issue of the application may be taken by an application provider, an application developer, and/or a device. For example, taking action to correct the performance issue of an application may include notifying a user who previously downloaded the application of the performance issue, and performing one or more actions including automatically removing the first application from the user's device, automatically providing a refund to the user, and/or automatically providing an updated version of the first application to the user. The updated version may correct the performance issue.

In some instances, an application may experience performance issues because of an overload associated with resources being used while running the application. For example, a gaming application may use multiple sensors on a device, such as a touch screen, an accelerometer, and a tilt sensor. The gaming application may crash and/or have performance issues based on an overload caused by simultaneous use of these multiple sensors. The application may not be able to process the data received from the multiple sensors at the rate the sensors provide data, leading to a failure of the application or other performance issue. As another example, the application may receive sensor data at a rate exceeding the storage space allocated for the data by the application, leading to a failure or other performance issue. As a result, an application provider may take action to correct the performance issue such as notify users who previously downloaded the gaming application of the performance issue, removing the gaming application from devices, and/or providing a refund to all users who previously downloaded the gaming application. Additionally, it may be the case that the gaming application is experiencing this performance issue while running on devices with OS version 1.0 and not with OS version 2.0. In this case, the application provider may notify users with OS version 1.0 of the performance issue associated with the gaming application, and recommend that users of OS version 1.0 upgrade to OS version 2.0 to correct the performance issue. In some instances, the upgraded OS version 2.0 may not be available on a user's device based on a restriction imposed by his particular wireless carrier. In this case, the application provider may notify the user that OS version 2.0 may correct the performance issue associated with the gaming application but that his particular wireless carrier is not currently supporting the upgrade.

Taking action to correct the performance issue of an application may also include notifying an application provider of the performance issue. In this case, an updated version of the application may be received and the updated version may correct the performance issue. Additionally, the updated version of the application may be provided to a user who previously downloaded the application. In some instances, an application provider may automatically provide a refund to a user who previously purchased the application.

Additionally, taking action to correct the performance issue of an application may include notifying an application developer of the performance issue. In this case, an updated version of the application may be received and the updated version may correct the performance issue. This updated version of the application may be provided to an application provider. For example, an application provider may receive performance criteria indicating that a weather application is crashing when running in combination with a specific stock ticker and city guide applications. As a result, several actions may be taken. One action may be that the application provider notifies the application developer of the weather application of the performance issue caused while running in combination with the stock ticker and city guide applications. The application developer may correct the performance issue with a new version of the weather application, which may be provided to the application provider. The application provider may provide this new version of the weather application to all users who previously downloaded the weather application or to only those users who previously downloaded the weather, stock ticker, and city guide applications.

Other actions may be taken to correct the performance issue of an application. For example, preventing the application from running simultaneously with one or more other applications, prioritizing use of the one or more functions of the device by the application or between the application and one or more other applications, prioritizing use of a sensor from among multiple sensors by the application, implementing a delay for use of the one or more functions between the application and one or more other applications, implementing a delay for use of a sensor from among multiple sensors by the application, and the like. Additionally, application data permissions may be different for particular applications running simultaneously. For example, a photo editing application and a social networking application may be running simultaneously and each may be attempting to use a mobile device's camera function at the same time, resulting in either one or both applications failing and/or crashing. As a result, a device may take several actions such as preventing the social networking application from running simultaneously with the photo editing application, prioritizing use of the camera function by the photo editing application over the social networking application, implementing a delay for use of the camera function by the social networking application while the photo editing application is running, and the like.

In some instances, a particular demographic of users may be experiencing a performance issue associated with an application which is caused by a resource utilization event. In this case, an action to correct the performance issue may be targeted to the particular demographic. For example, a gaming application may be experiencing performance issues only when running on "Smartphone 3" devices (i.e., a particular brand and/or hardware model device) but not on other device types. An action to correct this performance issue may be taken only with regard to Smartphone 3 devices. A demographic may refer to any segment of the population running an application and may refer to a device, a device manufacturer, OS version, locale, carrier, cellular standard, geographic region, and any other demographic having the at least one performance issue. For example, a demographic may be based on the particular device running an application such as Smartphone 4 devices, a specific brand of devices, the OS version on the device and/or any other device characteristic that may affect application performance. As another example, a demographic may be based on a specific wireless carrier of a device and/or a cellular standard offered by a wireless carrier, such as, CDMA, GSM, 3G, 4G, 4G LTE, and the like. A demographic may also be based on the locale and/or geographic region associated with a device and/or user. For example, a locale or geographic region may refer to a zip code, area code, city, county, state, country, continent, and/or a region of the world. Further, a demographic may include any combination of the above-described characteristics of a device, a carrier, and location and may further include any other characteristics that may affect application performance.

In an implementation, the communication between devices and an application provider may be across one or more bridges between the interfaces. For example, the communications between the devices and the application provider may be managed or assisted by a third device, such as a coordinating device, a local coordinator, a remote server, etc. In such cases, the third device may, for example, receive an indication that an application is experiencing a performance issue and determine that the performance issue is caused by a resource utilization event on a device. The third device may then provide the performance issue and the resource utilization event to the application provider, in which case, the application provider may take action to correct the performance issue. Alternatively, the third device may receive performance criteria from one or more devices and provide an indication that an application is experiencing a performance issue to the application provider. The application provider may determine that the performance issue is caused by a resource utilization event on a device. Accordingly, the application provider may take action to correct the performance issue. In an embodiment, the third device may also act as a bridge between the application provider and the devices when taking action to correct the performance issue. Furthermore, more than one intermediate device may be implemented to facilitate communication between devices and an application provider.

Although described in the examples above as being taken with respect to a single application, it will be clear to one of skill in the art that techniques for identifying and/or correcting performance issues may apply equally to multiple applications sequentially or concurrently. For example, in a case where a performance issue arises due to execution of two applications on a single device, the developer of each application may be notified of the performance issue. Similarly, where an action is taken to correct the performance issue, such as providing an updated version of an application, the same or different actions may be performed for each application. As a specific example, where a performance issue is identified due to a weather application and a GPS mapping application being installed or executing on a single device, an updated version of the weather application and an updated version of the GPS mapping application may be provided to the device, to an application provider, or the like as previously described. Similarly, different actions may be taken for each application based upon the other factors disclosed herein.

Figure 3:
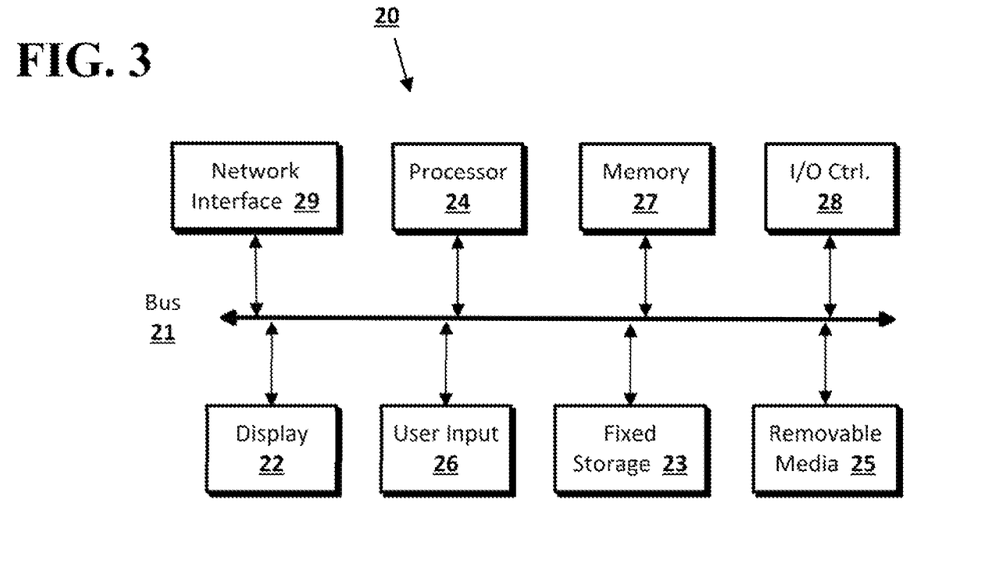
FIG. 3 shows a computer according to an implementation of the disclosed subject matter.

Embodiments of the presently disclosed subject matter may be implemented in and used with a variety of component and network architectures. FIG. 3 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 4.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
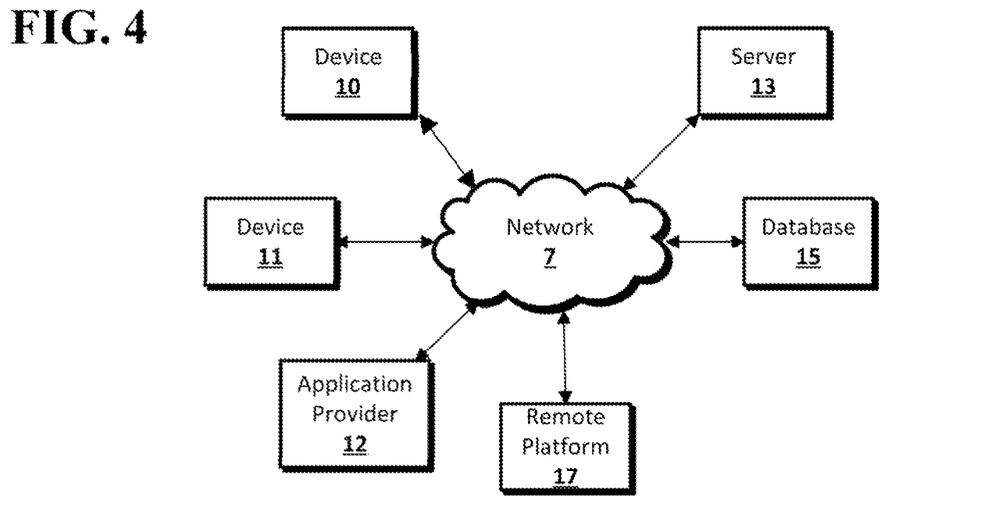
FIG. 4 shows a network configuration according to an embodiment of the disclosed subject matter.

FIG. 4 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13, application provider 12, and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13, application provider 12, and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method, comprising:
controlling, at an application provider, a network interface configured to receive, from a user device, an indication that a first application running on the user device is experiencing a performance issue;
controlling, at the application provider, a processor configured to determine that the performance issue is caused by a resource utilization event on the user device, wherein the resource utilization event comprises at least one selected from the group consisting of:
the first application and one or more other applications running simultaneously,
use of one or more functions of the user device simultaneously by at least one selected from the group consisting of: the first application and one or more other applications, and
a resource utilization overload based on simultaneous use of a plurality of sensors by the user device;
receiving, at the application provider, an updated version of the first application, wherein the updated version corrects the performance issue; and
providing, by the application provider, the updated version of the first application to the user device.

2. The method of claim 1, wherein the performance issue is selected from the group consisting of a run time error, an application failure, an application crash, an activity not responding error, a user-initiated negative feedback, a poor battery usage report, a processing delay, a processing error, and a trapped error.

3. The method of claim 1, wherein the one or more functions of the user device are selected from the group consisting of: camera, battery, touchscreen, keyboard, display, memory, Bluetooth, media player, location service, cellular network service, Internet service, messaging service, voice command service, and streaming content service.

4. The method of claim 1, wherein the plurality of sensors on the user device are selected from the group consisting of: a touchscreen, an accelerometer, a tilt sensor, a rotation sensor, a gyroscope, an orientation sensor, a digital compass, a barometer, a microphone, a camera, an ambient light sensor, a proximity sensor, an ambient temperature sensor, a gravity sensor, a motion sensor, and a global positioning system sensor.

5. The method of claim 1, wherein the user device is selected from the group consisting of a mobile device, a smartphone, a laptop, a tablet, a personal computer, a wearable computer, an appliance, and any other device capable of running an application.

6. The method of claim 1, further comprising:
notifying a user who previously downloaded the first application of the performance issue, and
performing at least one action selected from the group consisting of:
automatically removing the first application from the user device,
automatically providing a refund to the user, and
automatically providing an updated version of the first application to the user, wherein the updated version corrects the performance issue.

7. The method of claim 1, further comprising:
notifying an application developer of the performance issue.

8. The method of claim 1, further comprising:
automatically providing a refund to a user who previously purchased the first application.

9. The method of claim 1, further comprising:
preventing the first application from running simultaneously with the one or more other applications.

10. The method of claim 1, further comprising:
prioritizing use of the one or more functions of the user device between the first application and the one or more other applications.

11. The method of claim 1, further comprising:
prioritizing use of a sensor from among the plurality of sensors by the first application.

12. The method of claim 1, further comprising:
implementing a delay for use of the one or more functions between the first application and the one or more other applications.

13. The method of claim 1, further comprising:
implementing a delay for use of a sensor from among the plurality of sensors by the first application.

14. A system, comprising:
a network interface at an application provider; and
a processor configured to:
control the network interface to receive an indication, from a user device, that a first application running on the user device is experiencing a performance issue;
determine that the performance issue is caused by a resource utilization event on the user device, wherein the resource utilization event comprises at least one selected from the group consisting of:
the first application and one or more other applications running simultaneously,
use of one or more functions of the user device simultaneously by at least one selected from the group consisting of: the first application and one or more other applications, and
a resource utilization overload based on simultaneous use of a plurality of sensors by the user device;
receive an updated version of the first application, wherein the updated version corrects the performance issue; and
provide the updated version of the first application to the user device.

15. The system of claim 14, wherein the performance issue is selected from the group consisting of a run time error, an application failure, an application crash, an activity not responding error, a user-initiated negative feedback, a poor battery usage report, a processing delay, a processing error, and a trapped error.

16. The system of claim 14, wherein the one or more functions of the user device are selected from the group consisting of: camera, battery, touchscreen, keyboard, display, memory, Bluetooth, media player, location service, cellular network service, Internet service, messaging service, voice command service, and streaming content service.

17. The system of claim 14, wherein the plurality of sensors on the user device are selected from the group consisting of: a touchscreen, an accelerometer, a tilt sensor, a rotation sensor, a gyroscope, an orientation sensor, a digital compass, a barometer, a microphone, a camera, an ambient light sensor, a proximity sensor, an ambient temperature sensor, a gravity sensor, a motion sensor, and a global positioning system sensor.

18. The system of claim 14, wherein the user device is selected from the group consisting of a mobile device, a smartphone, a laptop, a tablet, a personal computer, a wearable computer, an appliance, and any other device capable of running an application.

19. The system of claim 14, wherein the processor is further configured to:
notify a user who previously downloaded the first application of the performance issue, and
perform at least one action selected from the group consisting of:
automatically removing the first application from the user device,
automatically providing a refund to the user, and
automatically providing an updated version of the first application to the user, wherein the updated version corrects the performance issue.

20. The system of claim 14, wherein the processor is further configured to:
notify an application developer of the performance issue.

21. The system of claim 14, wherein the processor is further configured to: automatically provide a refund to a user who previously purchased the first application.

22. The system of claim 14, wherein the processor is further configured to: prevent the first application from running simultaneously with the one or more other applications.

23. The system of claim 14, wherein the processor is further configured to: prioritize use of the one or more functions of the user device between the first application and the one or more other applications.

24. The system of claim 14, wherein the processor is further configured to: prioritize use of a sensor from among the plurality of sensors by the first application.

25. The system of claim 14, wherein the processor is further configured to: implement a delay for use of the one or more functions between the first application and the one or more other applications.

26. The system of claim 14, wherein the processor is further configured to: implement a delay for use of a sensor from among the plurality of sensors by the first application.

* * * * *